United States Patent [19]

Mataro

[11] Patent Number: 4,895,278
[45] Date of Patent: Jan. 23, 1990

[54] STUFFING-BATCHING MACHINES FOR FOOD PRODUCTS

[76] Inventor: Tomas S. Mataro, Génova 23, entlo. 8, esc B,, 08026 Barcelona, Spain

[21] Appl. No.: 110,349

[22] Filed: Oct. 20, 1987

[30] Foreign Application Priority Data

Oct. 20, 1986 [ES] Spain .................................. 8602884

[51] Int. Cl.⁴ .............................................. B65D 88/54
[52] U.S. Cl. .................................. 222/288; 222/293; 222/367; 418/23
[58] Field of Search ............... 222/288, 414, 283, 293, 222/367, 236, 237, 333; 418/229; 1/23

[56] References Cited

U.S. PATENT DOCUMENTS

| | | | |
|---|---|---|---|
| 1,722,031 | 7/1929 | Bert | 62/232 |
| 1,970,997 | 8/1934 | Dorman | 83/62 |
| 2,496,780 | 1/1947 | DeNardis, et al. | 146/177 |
| 2,836,369 | 3/1954 | Strehlow, et al. | 241/46 |
| 3,140,018 | 7/1964 | Miller | 222/283 |

FOREIGN PATENT DOCUMENTS

| | | |
|---|---|---|
| 1915008 | 10/1970 | Fed. Rep. of Germany . |
| 1653843 | 1/1973 | Fed. Rep. of Germany . |
| 3034160 | 3/1982 | Fed. Rep. of Germany ........ 418/23 |
| 197480 | 7/1973 | Spain . |
| 538595 | 12/1984 | Spain . |

Primary Examiner—Joseph J. Rolla
Assistant Examiner—Kenneth Noland
Attorney, Agent, or Firm—Fleit, Jacobson, Cohn, Price, Holman & Stern

[57] ABSTRACT

A stuffing-batching machine wherein the bottom of the blades pump chamber for stuffing comprises a detachable discoid plate having a recess in the top to pilot and guide the sliding blades eccentrically with respect to the chamber wall, the plate when assembled resting on an annular seat and locked in a determined angular position with respect to the chamber wall. A set of plates with different plotting of the pilot recess is provided, each plate providing a different degree of compression for the material treated. The propeller of the hopper feeding the product to be treated, is linked by a mechanical device interlocked with an annular part, associated in turn, through a ripid switch assembly, with the hopper lower section, where it remains locked by the arrangement of the propeller and is free once it is disconnected so that it can be pulled out.

5 Claims, 3 Drawing Sheets

STUFFING-BATCHING MACHINES FOR FOOD PRODUCTS

BACKGROUND OF THE INVENTION

1. Field of the Invention

The present invention relates to improvements in stuffing machines for food products, to be applied particularly to meat products treatment such as chopped meat in pork butchering, a general structure defined essentially by a stuffing propeller pump operatively coupled to a feeding hopper for the material to be treated, a vacuum intake associated with a pump chamber spaced from the intake, and a pump in the chamber.

2. Description of the Prior Art

Machines of this type are known from applicant's prior Spanish patent application No. 538,595, applied for in 1984; Utility Model No. 197,480, of the firm TALLERES CATO S.A., of 1973; Spanish patent application No. 411,863 of the firm COMERCIAL TECHNICA DE INDUSTRIAS CARNICAS, S.A. of 1973; and the German patents (Federal Republic) No. 1653843 of 1967 and 1915008 of 1969, of the firm ALBERT HANDTMANN, METALLGUSSWERK. In addition, there exists on the market a stuffing machine for meat products produced by the Swiss firm C. HOEGGER CIE. AG. that can also be referred to as a unit similar in basic structure to this type of machine.

BRIEF SUMMARY OF THE INVENTION

The object of this invention is to achieve a machine which is very easy to disassemble and with simple means, operating over the stuffing chamber and the loading hopper, and feasible in a short period of time, allowing an easy access to any point inside the pump housing and the feeding hopper to facilitate cleaning, which because of the nature of the products treated is essential. The machine incorporating the improvements of this invention, as well as the object of the Spanish patent application No. 538,595, of the same applicant, has available under the plate piloting the sliding blades a chamber with a blunt cone-shaped bottom with a slope toward the external part and at one side there is a spout for conveying outside the washing liquid and/or the residues of meat materials or other matter that could remain stuck to the walls of the working area, the driving motor being protected by a conical cap with a joint arrangement surrounding the driving shaft.

The bottom of the chamber is formed by a plate having on its top a continuous recess, eccentric with respect to the cylindrical wall of the chamber to pilot the blades, which are radially sliding and each blade is provided with an appendage near its internal lower edge that engages in the assembled position in that recess. The machine is equipped with two independent motors with their thrust axes parallel, duly synchronized, one to drive the rotor connected to the blades which are mounted with a slight eccentricity with respect to the circular chamber and arranged on its upper part over the blades, and the second motor to move the propeller feeding the food mass with a mechanical device externally to the pump chamber that remains completely closed at its top by a detachable casing and linked to the bottom of the loading hopper and adjusted on the rotor with a single communication with the loading area provided through a pre-established feeding passage.

Referring to the easy cleaning feature, it must be pointed out that the mounting and dismounting features of the feeding propeller acts as a bearing and traction therefor.

A further object of the invention is to provide easy dismounting that makes cleaning tasks more simple and when it is desired to change the type of the product, the improvement provides the possibility of varying the degree of compression of the material treated to adjust it to the percentage of effective filling of the cavity between blades at the loading area, typical of each product, to in a more effective way adapt to the particular characteristics of the material. For such object the machine of the invention has available a set of removable plates forming the bottom of the cavity, each with its continuous recess to pilot the sliding blades, eccentric with respect to the wall of the cavity, but with a different plotting.

The improvement is essentially characterized in that the bottom of the pump chamber with blades for stuffing, is formed by a removable discoid plate having means to lock it in a predetermined angular position with respect to the wall of the chamber. The machine has available a set of such plates each having a continuous recess or slot to pilot the sliding blades, eccentric with respect to the wall of the cavity and with an individual plotting, allowing the use of one or other of the plates, whose installation is simple, because of the assembly conditions of the pump elements. The point where the outer adjustment finishes with perfect engagement of the end edges of the blades, against the wall of the chamber where they contact after passing over the front of the loading area is adjustable by changing the plate. In this way it is possible to obtain for each plate used a determined value of compression of the material treated, that compensates for the differences in the ratio of effective filling of the chambers between blades that fluctuates as is well-known, according to the conditions of the material treated.

The assembly and release of the elements associated with the loading hopper to feed the material to be treated includes a propeller to make the material advance in the hopper linked by a locking mechanical device, such as a bayonet connection, or equivalent, a bearing annular part acting as a bearing and as a hauling device, associated in turn through a quick switch assembly to the low section of the feeding hopper, where it is locked specifically by the arrangement of the propeller and is free once it is disconnected and so that it can be pulled out. The annular bearing part has an extension at its lower part, constituting a gear to which a pinion is tangentially connected by means of an appropriate operation, independent, generally, of that moving the pump.

BRIEF DESCRIPTION OF THE DRAWINGS

The invention will now be described in detail with reference to the accompanying drawings wherein.

DETAILED DESCRIPTION

Figure 1:
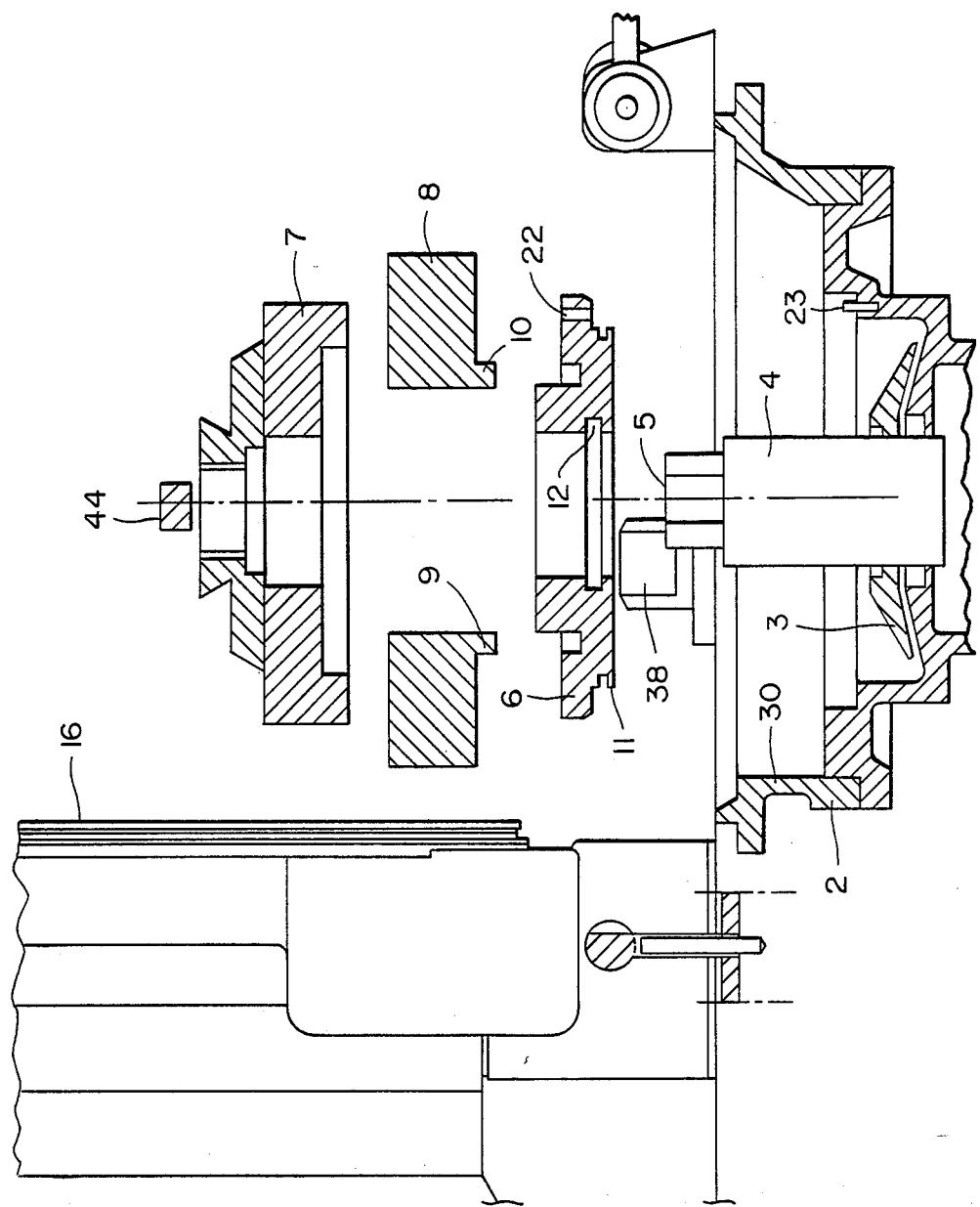
FIG. 1 is a schematic exploded cross-sectional view of parts of the invention in the stuffing pump cavity showing the blades rotor and angular locking means for fixing in a determined position the removable pilot plate for the pump blades.

Referring to FIG. 1, there is shown the lid 16 of the stuffing chamber in elevated position, the housing 2 having cylindrical wall 30 for cooperating with the blades pump, the blunt cone cap 3, sealing the motor (not shown) from the rest of the chamber and carrying in addition the cleaning fluid outside through a hole 15 made in a side of the low area (see FIG. 3), the motor shift 4 of the blades rotor, having a diametral slot 5 on the top thereof in which key 44 is inserted which also engages in slots in blades rotor 7 to couple the shaft 4 to the rotor for driving the rotor, a pinion housing 2 and that operates the pilot hopper propeller, the plate 6 forming the bottom of the housing 2 and removable pump blades, the blades rotor 7 and two of the blades 8, with their appendage, or lugs, 9, for interrelation with the plate 6 in a recess or continuous slot 10 therein which is eccentric with respect to the wall 30 of the chamber. Blades 8 are slidably engaged in rotor 7 so that the rotor drives the blades around the axis of rotation. This figure also shows the recesses 11 and 12 in plate 6 to receive sealing means for the pump chamber to maintain it closed at its bottom by plate 6. Also a hole 22 is seen, in plate 6 near the periphery, through which a pivot pin 23 is arranged to lock plate 6 in a certain angular position.

Figure 2:
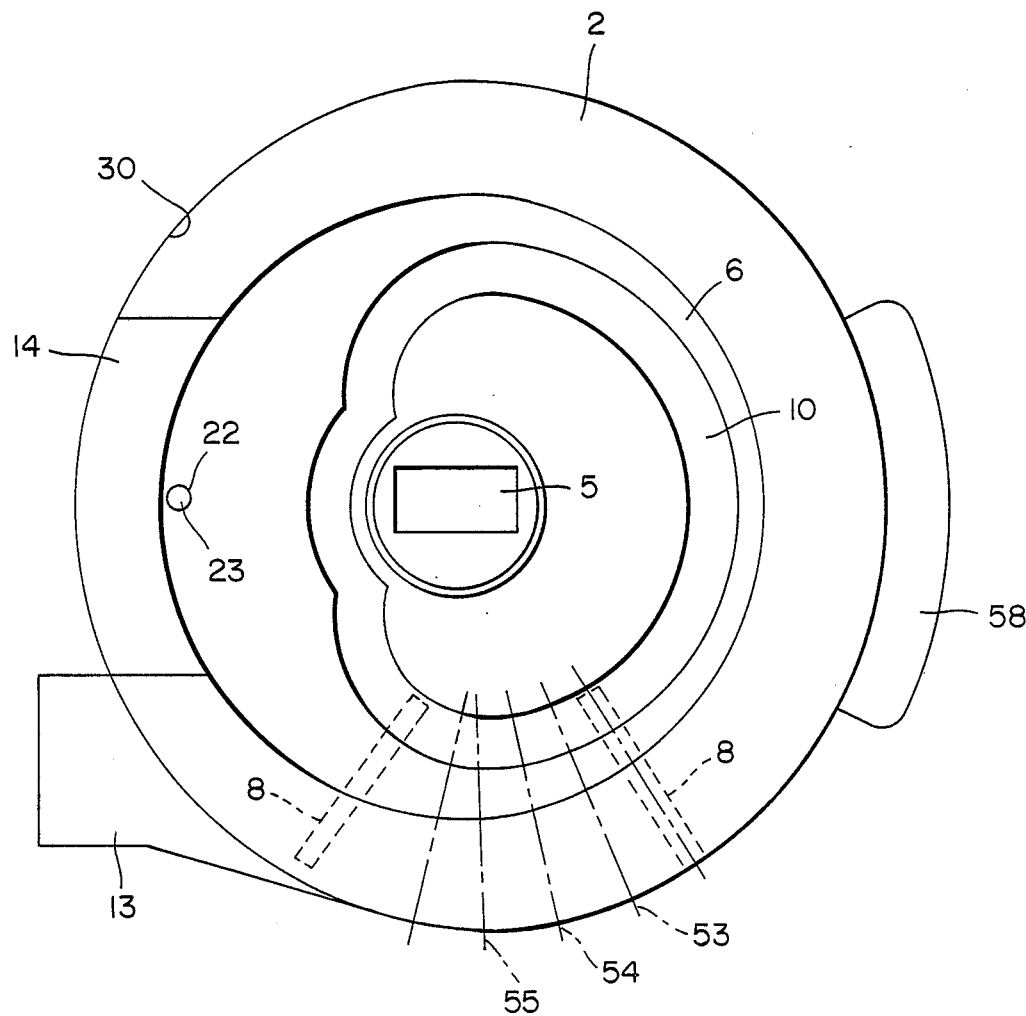
FIG. 2 is a schematic top plan view of a pilot discoid plate, for piloting sliding blades of the pump, from a set provided for the machine, located at the bottom of the stuffing chamber, and also showing the means used in its angular locking, once duly positioned, and a series of radial indications of the different positions of the blades, that will determine the use of any of the discoid plates, with a plotting of the pilot recess of the individual blades.

In FIG. 2 is shown the housing 2 of the stuffing chamber and at its bottom the pilot plate 6, with its recess or continuous slot 10 extending in a path which is eccentric to the chamber, the spout 13 for the material to stuff and a block 14 determined by a stop after the outlet area of the product and that can be replaced the same as plate 6 to increase the versatility of the machine. In this figure appears the angular fixing means in an operative position of the discoid plate 6, formed by the hole 22 and pin 23. Shown in a dotted line in the limit closing position from its passing in front of the loading area is blade 8 engaged with plate 6. Also near the stuffing chamber periphery are a series of radial dotted lines 53, 54, 55, showing the points from which a blade 8 is no longer adjusting, with regard to cylindrical wall 30 of housing 2 of the stuffing chamber, when using another plate 6, of the set included with the machine. Thus, by varying the plate 6, that forms the bottom of the cavity, among several prepared plates, different positions and closing limits of the blades are obtained, and in addition, a different compression level to compensate for example 10% or more. In the event the closing position is more to the left in the figure, a less defective filling of the chamber between the blades results after they have passed by the loading area 58, achieving thereby a stuffing much more regular and effective for the product treated.

Figure 3:
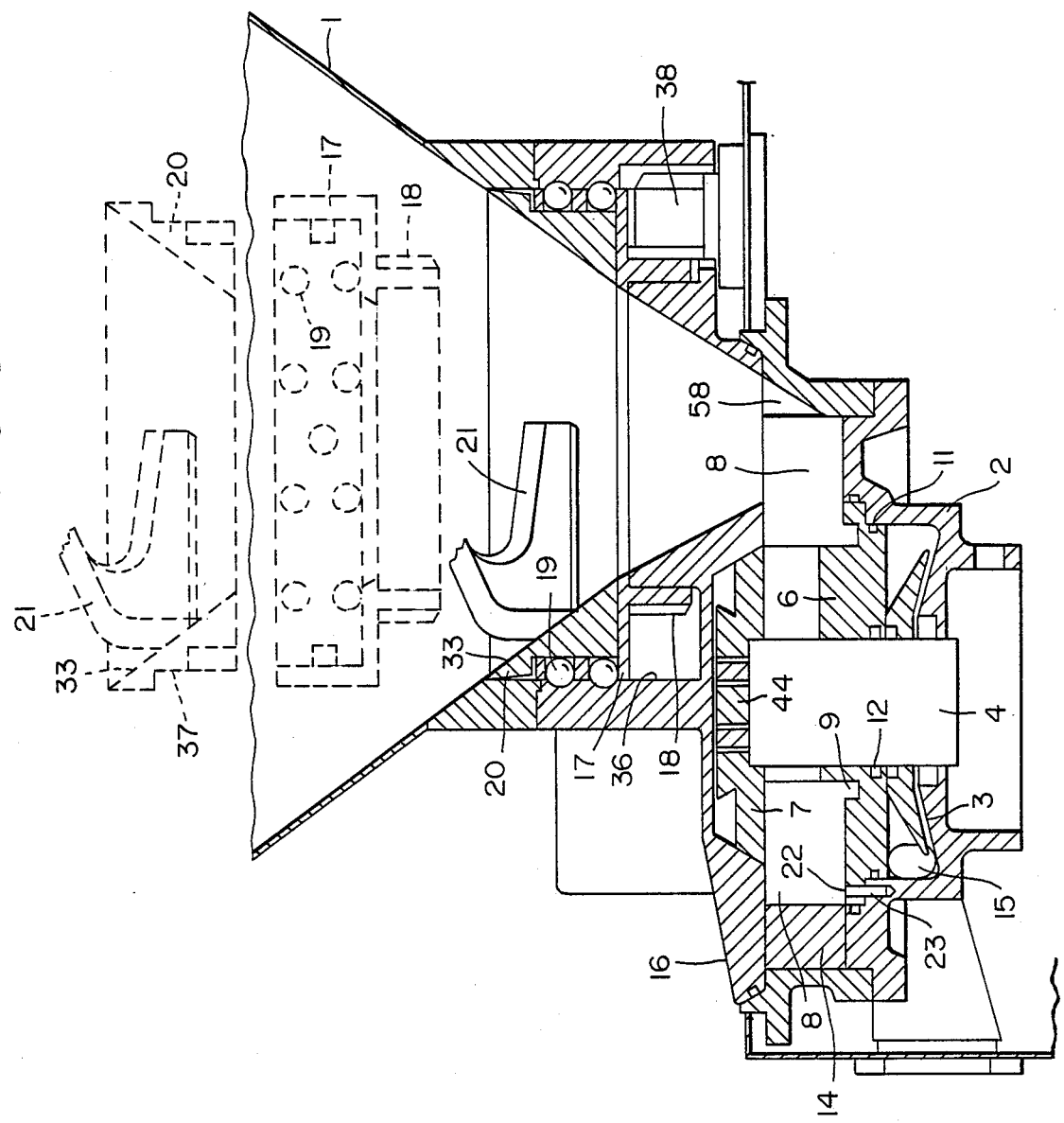
FIG. 3 is a cross-sectional view of the unit showing the assembled blades rotor and feeding hopper and the removable feeding propeller and annular support therefor in the mounted position and in exploded phantom lines in the dismounted position.

FIG. 3, in addition to the views of the above-mentioned elements in the two prior figures, shows a hole 15 to drain the cleaning fluid at the lower part of the stuffing machine, the lid 16 closing the chamber at the top over the rotor 7, and at the loading area the annular part 17 bearing a gear 18 engageable with a drive means generally shown at 38 at its lower part and a set of balls 19, or rolling means, that contact against the related circumferential recesses 31 defined at the lower section of the hopper 1 in the cylindrical wall 36 forming the chamber in which annular part 17 and propeller ring 20 are positioned in use. Also shown at the feeding or loading area are the propeller ring 20 having funnel-shaped portion 33 to which is attached at its bottom the propeller 21. Means are provided to lock the propeller ring by bayonet link, or coupling, to the side of the part 17.

Figure 4:
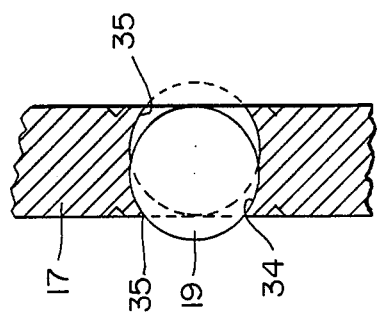
FIG. 4 is an enlarged detail view in cross-section of one of the balls acting as a rolling means, and the associated annular element supporting the feeding propeller.

In FIG. 4 a detail on a larger size shows how the balls or elements 19 are linked, though radially movable, to the part 17 by engagement in mounting holes 34 shaped to allow radial movement of balls 19 and having reduced diameter lips 35 for preventing balls 19 from falling out of the holes 34. It will be observed from FIG. 3 that when propeller ring 20 is inserted into annular part 17 in the assembled position, the outer cylindrical surface 37 contacts and urges balls 19 radially outwardly into retaining engagement with grooves 31.

What is claimed:

1. In a stuffing-batching machine including a pump housing, a hopper through which feed material to be processed is passed to a pump chamber in the housing having a cylindrical wall and a central axis, a blade-type pump in the pump chamber, a pump chamber intake operatively connecting the hopper to the pump chamber for passing feed material to the pump chamber and a pump chamber outlet, the improvement comprising:

a set of removable and interchangeable plate-shaped members each usable independently for forming the bottom of the pump chamber and each having a top surface and a bottom surface;

a continuous recess in said top surface of each plate-shaped member for guiding the blades of the pump, said recess defining a guide path eccentric with respect to the cylindrical wall of the pump chamber;

radially sliding blades in the pump chamber;

means for driving said blades in a rotary path through said pump chamber about the central axis of the pump chamber;

lugs on said blades engageable in said recess for guiding said blades in the pump chamber so that said blades pump feed material from the pump chamber intake to the pump chamber outlet;

an annular seat on said housing below said pump chamber;

an annular seat on said bottom surface of each plate-shaped member slidably engageable on said annular seat of said housing; and means for releasably locking said plate-shaped member in a predetermined angular position and against rotation in said pump chamber.

2. The improvement in the machine as claimed in claim 1 wherein:

said recesses in said removable plate-shaped members of said set define different guide paths for said lugs of said blades for varying the radial sliding and rotary movement of said blades in the pump chamber so that different sets produce different compression of the feed material during pumping.

3. The improvement in the machine as claimed in claim 1 wherein said releasable locking means comprises:
- a locking pin in said housing protruding upwardly from said annular seat in said housing; and
- a hole in each plate-shaped member through said annular seat thereof for receiving said locking pin.

4. The improvement in the machine as claimed in claim 1 wherein said hopper is in a hopper housing and has a central axis and further comprising:
- a cylindrical wall in said hopper housing defining a further chamber adjacent the lower end of the hopper; and
- a hopper feeding means in said further chamber comprising,
- an annular member removably mounted in said further chamber for rotation about said central axis of the hopper,
  - a propeller ring removably mounted on said annular member for rotation therewith,
  - a funnel-shaped surface on said propeller ring forming a portion of the lower part of said hopper,
  - a propeller on said propeller ring at least partly within said funnel-shaped portion and rotatable therewith for feeding feed material through the hopper, and
  - means engageable with said annular member for driving said annular member rotatably.

5. The improvement in the machine as claimed in claim 4 and further comprising:
- a cylindrical wall portion on said annular member;
- a plurality of circumferentially spaced holes through said wall portion;
- a plurality of ball members radially movable in said plurality of holes with respect to said hopper central axis, said holes being shaped to allow said radial movement of said ball members and retain said ball members in said holes at the limits of said radial movement;
- at least one circumferential groove in said cylindrical wall of said further chamber for rolling engagement with said ball members when said annular member is in the assembled position in said further chamber; and
- an outer cylindrical surface on said propeller ring engageable in rolling contact with said ball members when said propeller ring is in the assembled position on said annular member for urging said ball members radially outwardly into engagement with said at least one circumferential groove thereby releasably retaining said annular member in the hopper housing.

* * * * *